Sept. 4, 1923.  1,467,133
J. F. BRUST
ADJUSTABLE WATER DISCHARGE DEVICE
Filed Feb. 15, 1922
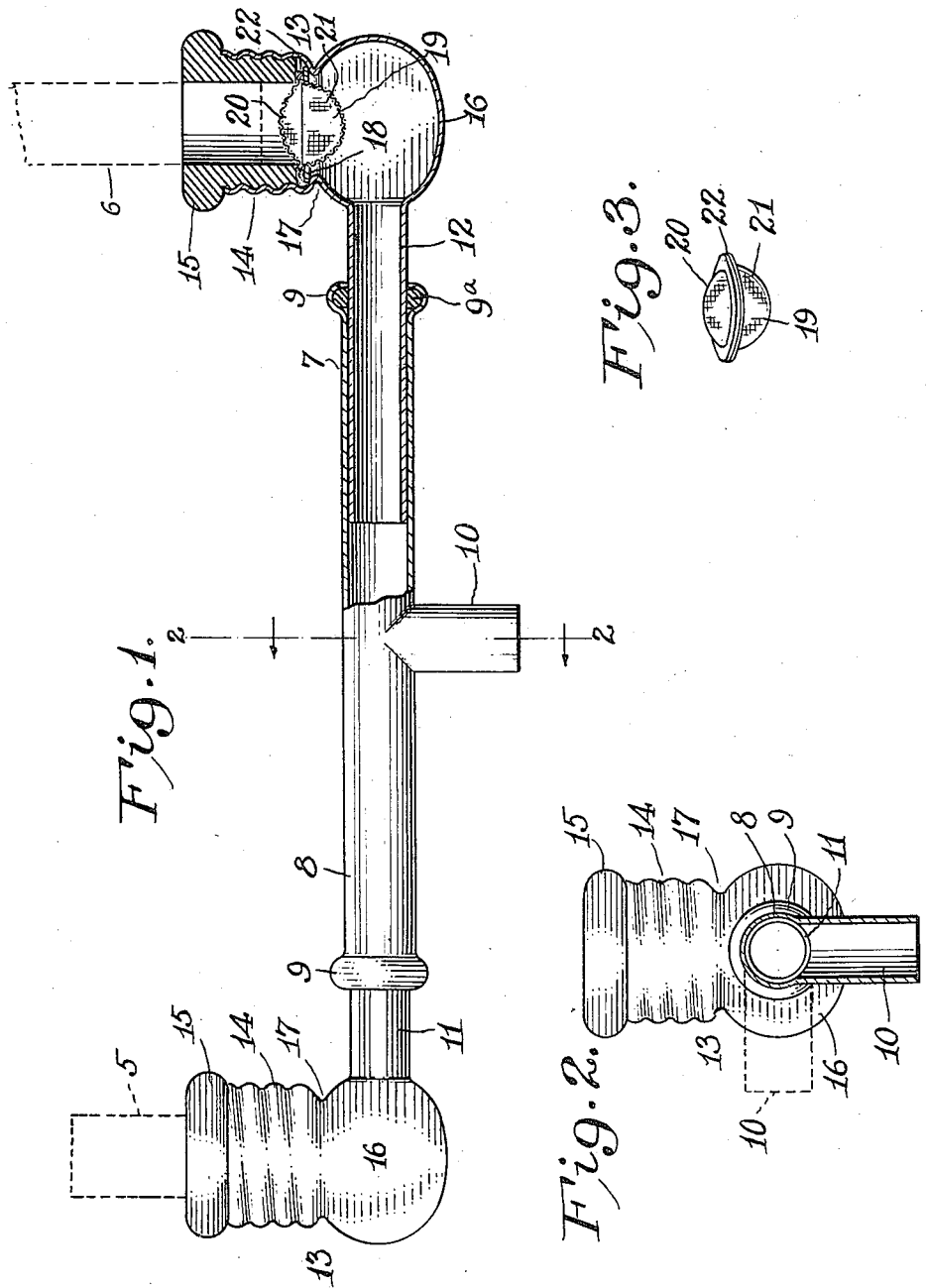
Inventor
Joseph F. Brust
By his Attorneys
Edgar Tate & Co.

Patented Sept. 4, 1923.

1,467,133

UNITED STATES PATENT OFFICE.

JOSEPH F. BRUST, OF BROOKLYN, NEW YORK.

ADJUSTABLE WATER-DISCHARGE DEVICE.

Application filed February 15, 1922. Serial No. 536,643.

*To all whom it may concern:*

Be it known that I, JOSEPH F. BRUST, a citizen of the United States, and residing at Brooklyn, in the county of Kings and State of New York, have invented certain new and useful Improvements in Adjustable Water-Discharge Devices, of which the following is a specification, such as will enable those skilled in the art to which it appertains to make and use the same.

This invention relates to water discharge devices adapted to be detachably mounted in connection with the usual faucets or water discharge spouts of sinks, basins, tubs and the like, said device being provided with coupling heads adapted to receive the discharge spouts of water faucets and the like, and the object of the invention is to provide means for adjustably connecting and mounting said coupling heads whereby hot and cold water, separately or collectively, may be passed through a discharge spout in said device; a further object being to provide means for straining the water passed through said coupling heads; and with these and other objects in view the invention consists in a device of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a face view of my improved water discharge device indicating the method of its use with parts of the construction broken away and in section;

Fig. 2 is a partial section on the line 2—2 of Fig. 1; and,

Fig. 3 a detail perspective view of a stationary member which I employ.

In Fig. 1 of the drawing, I have indicated in dotted lines at 5 and 6 the discharge spout of hot and cold water faucets which are usually spaced apart and with which the hot water supply pipe and cold water supply pipe are connected, and in said figure I have shown my improved water discharge device 7, which comprises a central tubular portion 8 with beaded ends 9 in which are mounted packing rings 9ª and centrally of the tubular member 8 is a radial tubular discharge spout 10.

Adjustably mounted in the opposite end portions of the tubular member 8 are supplemental tubes 11 and 12 provided with coupling heads 13 having projecting threaded extensions 14 adapted to receive flexible packing sleeves 15 composed of rubber or other material and into which the discharge spouts 5 and 6 are adapted to pass as clearly shown at the right of Fig. 1.

The coupling heads 13, or the bottom portions 16 thereof join the extensions 14 by contracted necks 17 upon which are placed metal rings 18 upon which are also placed strainer devices 19, one of which is shown in detail in Fig. 3 of the drawing, and the strainer devices and rings are held in place by the sleeves 15.

The strainer devices 19 are composed of top and bottom concavo-convex portions 20 and 21, which are joined by flanges 22 approximately centrally thereof, and these flanges rest upon the rings 18.

In the use of my improved device it will be understood that the coupling heads 13, or the tubes 11 and 12 thereof are adjusted inwardly or outwardly in the tube 8 to bring said coupling heads in position to be passed over hot and cold water discharge spouts 5 and 6, as indicated in dotted lines in Fig. 1 of the drawing and, in practice, the discharge spout 10 of the tube 8 is normally directed downwardly, and either hot water or cold water may be separately discharged through the spout 10, or a combination of hot and cold water discharged therethrough. It will also be apparent that by rotating the tube 8 on the tubes 11 and 12 the discharge spout 10 may be directed forwardly as indicated in dotted lines in Fig. 2, or upwardly, if desired, to facilitate the mounting of a rubber hose, sprinkler devices or the like in connection therewith, or to produce an upwardly directed water discharge spout for drinking or other purposes, and while I have shown certain details of construction for carrying my invention into effect and have illustrated one use thereof, it will be apparent that I am not necessarily limited to the construction herein shown and described, and various changes therein and modifications thereof may be made, within the scope of the appended claims, without departing from the spirit of my invention or sacrificing its advantages.

Having fully described my invention, what I claim as new and desire to secure by Letters Patent, is:—

1. A water discharge device of the class described comprising a central tubular member provided with a discharge spout, L-shaped tubular members detachably and movably mounted in connection with said first named member and comprising parts adapted to extend into and out of said first named member and threaded parts joined to said first named parts through enlarged bodies, the free ends of said first named member being enlarged to form annular recesses and packing rings mounted in said recesses to seal the connection between said members, and said L-shaped members being provided with strainer devices.

2. A water discharge device of the class described comprising a central tubular member provided with a discharge spout, L-shaped tubular members detachably and movably mounted in connection with said first named member and comprising parts adapted to extend into and out of said first named member and threaded parts joined to said first named parts through enlarged bodies, the free ends of said first named member being enlarged to form annular recesses and packing rings mounted in said recesses to seal the connection between said members, said L-shaped members being provided with strainer devices, and means for retaining said strainer devices in said members and for mounting said members in connection with suitable supports.

In testimony that I claim the foregoing as my invention I have signed my name this 9th day of February, 1922.

JOSEPH F. BRUST.